Oct. 19, 1965 F. S. MACKLEM 3,213,347

SOLID STATE INVERTER

Filed Jan. 30, 1963 2 Sheets-Sheet 1

INVENTOR.
F. SUTHERLAND MACKLEM
BY Hopgood & Calimafde
ATTORNEYS

INVENTOR.
F. SUTHERLAND MACKLEM
BY Hopgood & Calimafde
ATTORNEYS

United States Patent Office 3,213,347

Patented Oct. 19, 1965

3,213,347

SOLID STATE INVERTER

F. Sutherland Macklem, New Canaan, Conn., assignor to Ovitron Corporation, Newburgh, N.Y., a corporation of Delaware Filed Jan. 30, 1963, Ser. No. 254,879
6 Claims. (Cl. 321—4)

Figure 1:
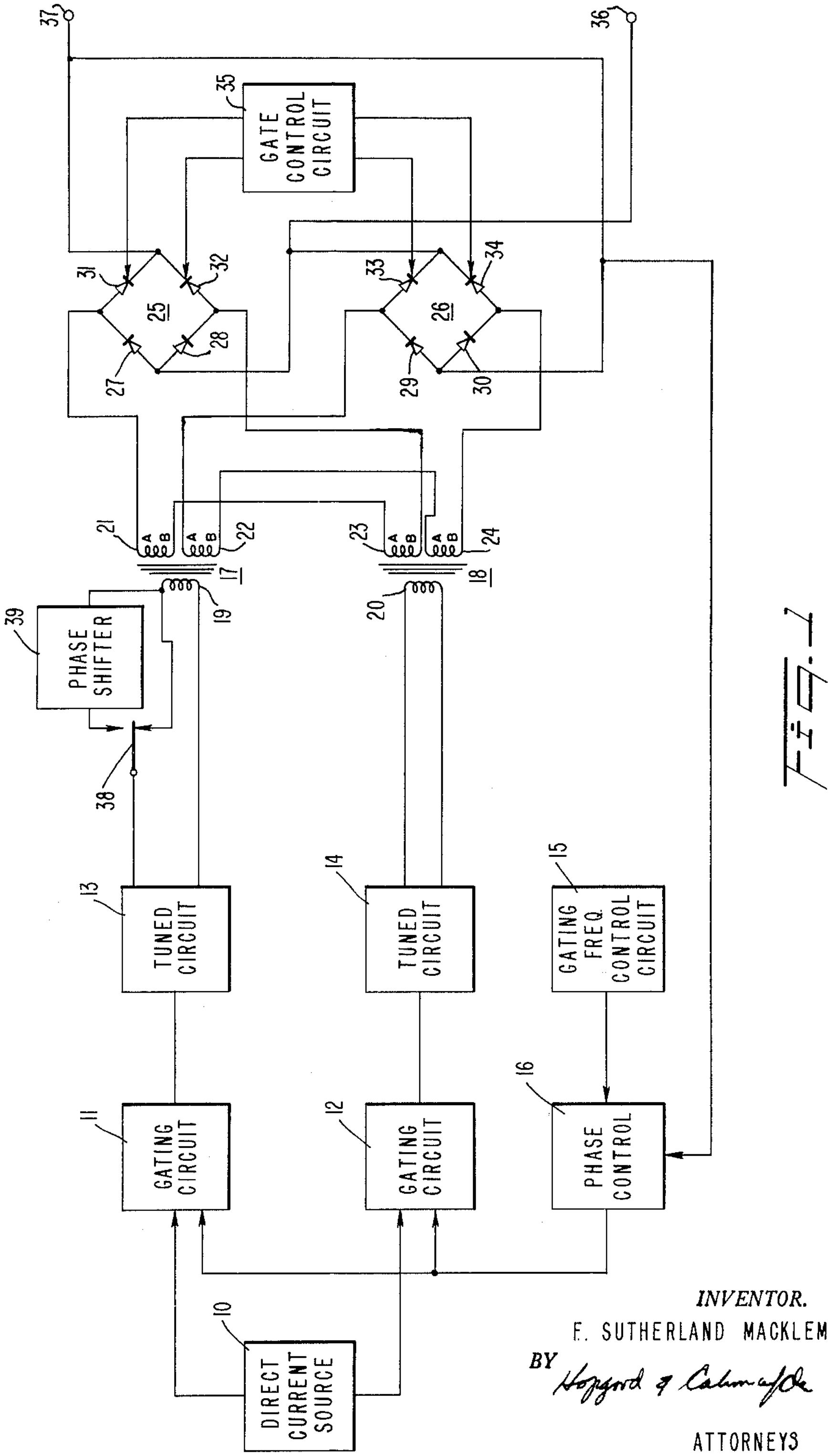

This invention relates in general to electrical inverters and more particularly to inverters utilizing solid state components for converting power at high power levels such as ten to fifteen kilowatts.

In the past, it has not been possible to utilize solid state components for generating alternating current directly from a direct current source at power levels of ten to fifteen kilowatts or above. Attempts to employ components such as silicon controlled rectifiers for generating power at levels above one kilowatt have encountered formidable problems, even though conventional silicon controlled rectifiers have a high power-handling capacity. These problems are inherent in the nature and limitations of the component.

Foremost among the problems encountered in the use of silicon controlled rectifiers is the extreme rapidity of transition between the two possible states of the device. As a result of this rapidity of transition, control cannot be exercised over the rectifier, and it can only be "turned off" from the "on" state by arresting the flow of current through it for a substantial operating period of time. In addition, since a silicon controlled rectifier is essentially a switch, it produces a square wave output, whereas at high power levels a low distortion, sinusoidal output wave is necessary.

Conventional direct inversion circuits employing series, parallel or hybrid arrangements of solid state components also produce highly distorted waveforms due to the action of the commutating elements of the circuits. In order to obtain a low distortion, sinusoidal output wave, filtering must be introduced into the circuit. The filtering has to be done with purely reactive elements which, in addition to being impractical for size and weight, also introduce a time delay into the arrangement. This delay is proportional to the harmonic attenuation required and greatly complicates the problem of regulating the voltage level of the sinusoidal output wave.

Accordingly, it is an object of the invention to provide an improved circuit arrangement employing solid state components for converting direct current to alternating current in the form of low distortion, sinusoidal output waveforms at power frequencies.

It is another object of the invention to provide an inverting arrangement employing solid state components, such as silicon controlled rectifiers, which makes advantageous use of the inherent characteristics of the components, namely, capability of handling large power levels, high power gain, and speed of switching, to produce alternating current directly from a direct current source at power levels of ten kilowatts and above.

It is a further object of the invention to provide an inverting arrangement having provision for voltage and frequency regulation.

A further object of the invention is to provide a circuit arrangement which can produce a multi-phase sinusoidal output wave.

In accordance with the basic concept of this invention, high power alternating current voltages are synthesized by detecting the modulation envelope of a high frequency amplitude modulated signal which is formed by mixing together two separate high frequency A.C. signals that differ in frequency by twice the desired output frequency. The two high frequency A.C. signals are generated from a high power D.C. source in a standard high power oscillator circuit or in a novel chopper circuit as taught herein. When mixed together, these two signals produce a beat-frequency modulation envelope in accordance with well known prior art principles. Alternate halves of this envelope are detected and filtered by a switched detector to produce a high power alternating current output voltage having the desired frequency.

Since this invention utilizes high frequency signals, it provides a very significant reduction in component size and weight, particularly in the filter and transformer elements. Furthermore the output signal of this invention is very nearly sinusoidal in form because it is synthesized from a sine wave rather than a square wave output. Also, the output frequency and phase angle can be very easily controlled in this invention by changing one of the high frequency A.C. signals, which have a high speed of response. This latter feature makes the invention particularly useful in multi-phase power systems and in systems which require close control of output frequency.

Figure 2:
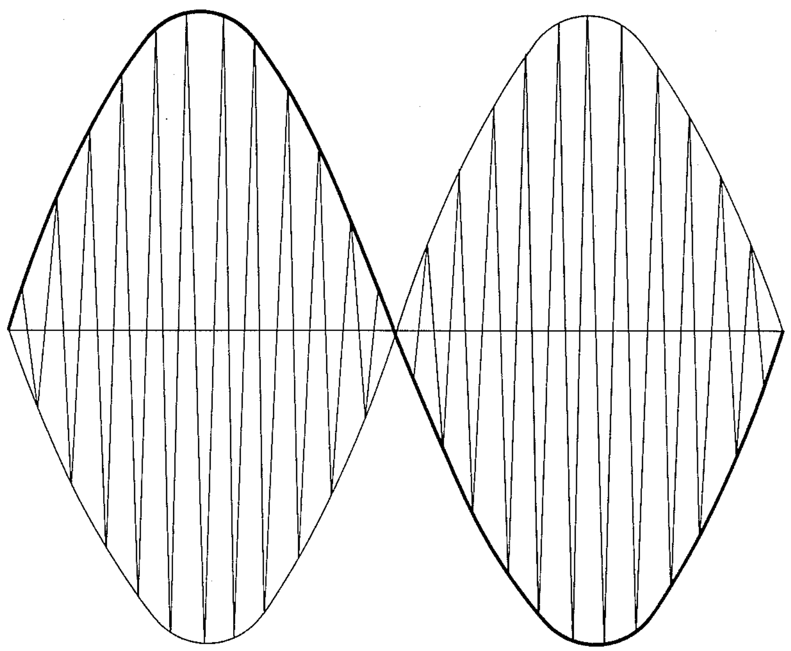

The above mentioned and other features and objects of this invention and the manner of obtaining them will become more apparent and the invention itself will be best understood by reference to the following description of an embodiment of the invention taken in conjunction with the accompanying drawing, wherein:

FIG. 1 is a circuit diagram of one illustrative inverting arrangement of the invention; and, FIG. 2 is a diagram of the envelope and waveform produced by the arrangement of FIG. 1.

The inverting arrangement of the invention, which preferably utilizes solid state components to gate the flow of direct current to tuned circuits, is described, for purposes of illustration, as producing a sinusoidal output waveform having a frequency of 60 cycles per second (c.p.s.). As shown in FIG. 1, a source of direct current 10 is coupled through gating circuits 11–12 to a pair of tuned circuits 13–14, respectively.

Each gating circuit 11–12 includes a single solid state component, which is preferably a conventional silicon controlled rectifier, having anode, cathode and control electrodes. High power gain, high power level handling capacity, and a switching speed having an upper limit of about twenty kilocycles (kc.), are among the inherent characteristics of silicon controlled rectifiers, which are advantageously utilized in the invention for inverting direct current at power levels of ten to fifteen kilowatts.

To enhance the switching speed, direct current from the source 10 is gated to the tuned circuits 13–14 by coupling the control electrodes of the components to the gating frequency control circuit 15. The gating frequency is established at a value (for example, six kilocycles) between the frequency of the desired alternating current output waveform (previously designated as 60 c.p.s.) and the inherent upper switching limit for silicon controlled rectifiers. By gating the circuits 11–12 at this frequency, the direct current that is passed to the tuned circuits 13–14 is in the form of pulsations.

The tuned circuits 13–14, which may be simple tank circuits having inductive and capacitive components, are driven into an oscillatory state by the direct current pulsations, the frequency of oscillation for each circuit being determined by the components of that circuit so that each circuit oscillates at a different frequency. This difference between the frequencies of oscillation is established to be twice the frequency of the desired alternating current output wave.

As shown in the drawing, the oscillation frequency for the circuit 13 is 6 kc., whereas the frequency of oscillation for the circuit 14 is 6.12 kc. The difference between the two is 120 c.p.s. or twice the previously indicated desired output frequency of 60 c.p.s. If a 400 c.p.s. alternating current waveform is desired, such as for use in aircraft applications, this difference frequency would be established at 800 c.p.s.

As previously indicated, the choice of a 6 kc. gating frequency is purely arbitrary, except that it must be well above the desired 60 c.p.s. output frequency and well below the inherent limit for a silicon controlled rectifier. In practice, the different frequency of operation may be chosen by selecting a frequency control circuit 15 having a different standard frequency, frequency determining elements having accurate settings and small tolerances being readily available as standard commercial units.

It will be apparent to those skilled in the art that the above described gating circuits could be replaced by two standard high power radio frequency oscillators if desired, with the oscillators tuned to different frequencies as described above. It will also be apparent that the tuned circuits 13 and 14 will resonate at different frequencies even though they are excited by a common pulse frequency, and therefore that the gating circuit-tuned circuit arrangement of FIG. 1 is the full equivalent of two independent oscillators.

The oscillation outputs of the tuned circuits 13–14 are applied to the primary windings 19–20 of coupling transformers 17–18, respectively, the secondary windings being series connected to the sum the oscillation outputs. Secondary winding 21 is connected to winding 23 and both are coupled to a rectifier bridge 25. Similarly, winding 22 is connected to winding 24 and both are coupled to a second rectifier bridge 26. Assuming that the oscillation outputs of the tuned circuits 13–14 have about the same amplitude characteristics, summing them produces the envelope and waveform of FIG. 2.

Each rectifier bridge 25–26 includes two conventional rectifying diodes 27–28 and 29–30, respectively, and two silicon controlled rectifiers 31–32 and 33–34, respectively. The rectifiers 31–34 are normally closed and have their control electrodes connected to a gate control circuit 35.

Referring again to FIG. 2, the heavily drawn part of the envelope is a sinusoidal waveform having the desired frequency, 60 c.p.s. This waveform is obtained at the output terminals 36–37 by full-wave rectification of the summed outputs of the tuned circuits 13–14 and, thereafter, by alternately selecting positive and negative halves of the envelope of the rectified waveform. The selection is made by gating the appropriate rectifiers 31–34 to an "on" condition with pulses supplied by the gate control circuit 35.

For example, the positive portion of the heavily drawn envelope of FIG. 2 is obtained across the terminals 36–37, when the points designated A on the transformer secondary windings 21–24 are at a negative potential and the points designated B are at a positive potential. Assuming that the current flows in the conventional direction from positive to negative, the flow may be traced from the terminal 37, which is positive, through the rectifier 30, the windings 24 and 22, and the gated diode 33 to the terminal 36, which is negative. During this portion of the cycle, the diode 33 is gated "on," and the diode 32 is in the gated "off" condition. Hence, current does not flow through the bridge circuit 25.

The negative portion of the heavily drawn envelope is obtained during the latter portions of the cycle by gating the rectifier 31 "on," the rectifier 34 being in the "off" condition. The points A and B are at positive and negative potentials, respectively. The flow of current is from terminal 36, which now is positive through the diode 27, windings 21 and 23, and the gated diode 32 to the terminal 37. Since the diode 34 is in the gated "off" condition, the flow of current is blocked through the bridge circuit 26.

The sinusoidal output waveform has a twelve kilocycle ripple superimposed on it which can be eliminated by simple filtering of the waveform. This filter, it should be noted, is very small and light in weight compared to the 60 c.p.s. tuned circuits required to smooth a 60 c.p.s. square wave output.

It will be apparent to those skilled in the art that gate control circuit 35 must contain an oscillator tuned to the desired power frequency so that it will switch diodes 31, 32, 33, and 34 at the proper time with respect to the modulation envelope. This oscillator can be a free-running multivibrator, or any other suitable low frequency oscillator, and its frequency is preferably adjustable from a relatively low power frequency (60 c.p.s.) to a relatively high power frequency (800 c.p.s.) so that the same structure can be used to produce any desired power frequency output. It will also be apparent to those skilled in the art that the phase angle of the modulation envelope, or the above described low frequency oscillator must be adjustable so that the switching time of gate control circuit 35 can be adjusted to coincide with the nodes of the modulation envelope.

Phase control 16 is an output amplitude control which regulates the output amplitude by varying the phase of modulation envelope while the phase of gate control circuit 35 remains fixed. In this particular embodiment, phase control 16 is referenced to the output voltage, as shown in FIG. 1, and is adapted to automatically change the phase of gating frequency control circuit 15 in response to changes in the amplitude of the output voltage. Phase control 16 is adapted to move out of synchronism with gate control circuit 35 when the output voltage rises and to move into synchronism with gate control circuit 35 when the output voltage drops. This automatically counteracts the change of output voltage amplitude, as will be apparent to those skilled in the art. Phase control circuit 16 can comprise any suitable prior art phase control circuit which is responsive to both a manual control and a voltage level, many of which are known to those skilled in the art.

The embodiment shown in FIG. 1 is adapted for use in single phase or multi-phase power installations by means of switch 38 and phase shifter 39. In the single phase mode of operation, which is selected by the switch position shown in the drawings, the output of tuned circuit 13 is applied directly to the primary of transformer 17. In the other switch position it is routed through phase shifter 39 which shifts the phase of the modulation envelope by a predetermined amount. Multi-phase installations require a plurality of modulation-detector circuits such as shown in FIG. 1. For example, a three phase installation requires three such circuits, one for each output phase. These three circuits are set to produce output signals which are staggered in phase by 120° by appropriate adjustments in their phase shifters 39. One output terminal of each circuit is coupled to a common output conductor and the other output terminal defines phase A, B, or C of the three phase output.

While the foregoing description sets forth the principles of the invention in connection with specific apparatus, it is to be understood that this description is made only by way of example and not a limitation of the scope of the invention as set forth in the objects thereof and in the accompanying claims.

What is claimed is:

1. An inverter adapted to convert direct current to alternating current of a predetermined frequency, comprising a source of direct current, first and second tuned circuits adapted to oscillate at first and second oscillating frequencies respectively, the difference frequency between said first and second frequencies being equal to twice said predetermined frequency, means including solid state components for interrupting said direct current into pulsations of direct current at a frequency approximately equal to one of said oscillating frequencies, means for applying said pulsations of direct current to said first and second tuned circuits respectively, whereby said tuned circuits are driven into oscillation at said first and second frequencies respectively, means for combining the outputs from said tuned circuits to produce a summed waveform whose envelope has said predetermined frequency, and means for selecting alternate halves of said envelope to produce a sinusoidal alternating current waveform of said predetermined frequency.

2. The inverter of claim 1, wherein the interrupting means comprises first and second gating circuits, each including a solid state component having anode, cathode and control electrodes, and control means coupled to the control electrode of each of said components for regulating the frequency of interrupting, whereby said first and second gating circuits gate the flow of direct current from said source to said first and second tuned circuits respectively.

3. The inverter of claim 2, wherein said solid state components are controlled rectifiers having interrupting frequencies in the range above said predetermined frequency and below the inherent maximum gating frequency for said components.

4. The inverter of claim 1, and further comprising phase control means referenced to the output of the selecting means and coupled to said interrupting means for regulating the voltage level of said sinusoidal waveform.

5. The inverter of claim 1, and further comprising means coupled to the output of said first tuned circuit for phase shifting the oscillation output of said first tuned circuit to obtain a multiphase alternating current waveform.

6. An inverter adapted to convert direct current to alternating current at a predetermined frequency, said inverter comprising a first and a second high frequency oscillator, said oscillators being powered by a direct current source and being tuned to different frequencies, and the difference between the two frequencies being equal to twice said predetermined frequency, means for combining the outputs of said oscillators to produce a composite waveform which is amplitude modulated by said difference frequency, and means for detecting alternate halves of said envelope to produce an alternating current waveform of said predetermined frequency.

References Cited by the Examiner

UNITED STATES PATENTS

| | | | |
|---|---|---|---|
| 2,929,013 | 3/60 | McNamee | 321—35 |
| 3,041,551 | 6/62 | Dornhoefer | 331—75 X |
| 3,061,741 | 10/62 | Eckermann et al. | 307—88.5 X |
| 3,061,797 | 10/62 | Grenier | 331—114 X |

LLOYD McCOLLUM, *Primary Examiner.*